United States Patent
Iwane

(10) Patent No.: US 10,404,904 B2
(45) Date of Patent: Sep. 3, 2019

(54) FOCUS DETECTION DEVICE, FOCUS ADJUSTMENT DEVICE, AND CAMERA

(71) Applicant: NIKON CORPORATION, Tokyo (JP)

(72) Inventor: Toru Iwane, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 302 days.

(21) Appl. No.: 15/113,252

(22) PCT Filed: Jan. 28, 2015

(86) PCT No.: PCT/JP2015/052282
§ 371 (c)(1),
(2) Date: Dec. 13, 2016

(87) PCT Pub. No.: WO2015/115452
PCT Pub. Date: Aug. 6, 2015

(65) Prior Publication Data
US 2017/0104918 A1    Apr. 13, 2017

(30) Foreign Application Priority Data
Jan. 28, 2014   (JP) .................. 2014-013483

(51) Int. Cl.
*H04N 5/232*   (2006.01)
*G02B 7/09*    (2006.01)
(Continued)

(52) U.S. Cl.
CPC ....... *H04N 5/23212* (2013.01); *G02B 3/0056* (2013.01); *G02B 7/09* (2013.01);
(Continued)

(58) Field of Classification Search
CPC .... H04N 5/23212; G02B 7/09; G02B 3/0056; G02B 7/34
See application file for complete search history.

(56) References Cited

U.S. PATENT DOCUMENTS

2002/0080259 A1   6/2002  Izumi
2003/0086013 A1   5/2003  Aratani
(Continued)

FOREIGN PATENT DOCUMENTS

JP   2007-011314 A   1/2007
JP   2008-304808 A   12/2008
(Continued)

OTHER PUBLICATIONS

Mar. 2, 2018 Search Report issued in European Patent Application No. 15743019.0.
(Continued)

*Primary Examiner* — Abdelaaziz Tissire
(74) *Attorney, Agent, or Firm* — Oliff PLC

(57) ABSTRACT

A focus detection device includes: an image capture unit that has a plurality of light receiving units provided for each of a plurality of micro lenses, and that captures image by light from a subject that has passed through an optical system; and a focus detection unit that detects a focusing state of the optical system according to a relative positional deviation of the images of the subject with respect to the micro lenses, with the image of the subject being created by each of the micro lenses and being captured by the image capture unit.

19 Claims, 6 Drawing Sheets

(51) Int. Cl.
  *G02B 3/00* (2006.01)
  *G02B 7/34* (2006.01)
  *G03B 13/36* (2006.01)
  *G03B 19/12* (2006.01)

(52) U.S. Cl.
  CPC ............... *G02B 7/34* (2013.01); *G03B 13/36* (2013.01); *G03B 19/12* (2013.01)

(56) References Cited

U.S. PATENT DOCUMENTS

| | | | |
|---|---|---|---|
| 2007/0206940 A1 | 9/2007 | Kusaka | |
| 2008/0277566 A1* | 11/2008 | Utagawa | G02B 7/34 250/208.1 |
| 2008/0302947 A1* | 12/2008 | Utagawa | G02B 7/32 250/201.8 |
| 2009/0140131 A1* | 6/2009 | Utagawa | G02B 3/0056 250/226 |
| 2010/0215354 A1* | 8/2010 | Ohnishi | G02B 7/38 396/113 |
| 2010/0232776 A1* | 9/2010 | Ohnishi | G02B 7/346 396/104 |
| 2015/0130986 A1* | 5/2015 | Ohnishi | H04N 5/23212 348/349 |

FOREIGN PATENT DOCUMENTS

| | | |
|---|---|---|
| JP | 2009-151154 A | 7/2009 |
| JP | 2010-191366 A | 9/2010 |
| JP | 2010-224165 A | 10/2010 |
| JP | 2013-061582 A | 4/2013 |
| WO | 2013/161944 A1 | 10/2013 |
| WO | WO-2013161944 A1 * | 10/2013 ......... H04N 5/23212 |

OTHER PUBLICATIONS

Apr. 28, 2015 International Search Report issued in International Patent Application No. PCT/JP2015/052282.

Feb. 6, 2018 Office Action issued in Japanese Application No. 2014-013483.

Feb. 25, 2019 Office Action issued in Chinese Patent Application No. 201580016875.3.

\* cited by examiner (a)

(b)

FOCUS DETECTION DEVICE, FOCUS ADJUSTMENT DEVICE, AND CAMERA

TECHNICAL FIELD

The present invention relates to a focus detection device, to a focus adjustment device, and to a camera.

BACKGROUND ART

A focus detection device is per se known in which a plurality of photoreception elements are arranged to each of micro lenses that are arranged in a two dimensional pattern, and that performs focus detection by a so-called phase difference method, in which an amount of image deviation is detected on the basis of the photoreception outputs of those pluralities of photoreception elements. For example, in Patent Document #1, a focus detection device is described that eliminates false focusing upon a subject that has a periodic pattern by generating at least three signal sequences and thus obtaining a plurality of amounts of image deviation.

CITATION LIST

Patent Literature

Patent Document #1: Japanese Laid-Open Patent Publication 2008-304808.

SUMMARY OF INVENTION

Technical Problem

With this prior art technique there has been the problem that, if the image forming position of the image of the subject and the predetermined focusing plane are substantially separated from one another, then the accuracy of focus detection is deteriorated.

Solution to Technical Problem

According to the 1st aspect of the present invention, a focus detection device comprises: an image capture unit that has a plurality of light receiving units provided for each of a plurality of micro lenses, and that captures image by light from a subject that has passed through an optical system; and a focus detection unit that detects a focusing state of the optical system according to a relative positional deviation of the images of the subject with respect to the micro lenses, with the image of the subject being created by each of the micro lenses and being captured by the image capture unit.

According to the 2nd aspect of the present invention, it is preferred that in the focus detection device according to the 1st aspect, the focus detection unit obtains the positional deviation with respect to the micro lenses from difference between output data of a plurality of light receiving units provided to a first micro lens, and output data of a plurality of light receiving units provided to a second micro lens.

According to the 3rd aspect of the present invention, it is preferred that in the focus detection device according to the 2nd aspect, the focus detection unit obtains the positional deviation with respect to the micro lenses from the difference of amount of displacement, with the difference obtained while varying the amount of displacement of the output data of the plurality of light receiving units provided for the second micro lens with respect to the output data of the plurality of light receiving units provided for the first micro lens being a minimum.

According to the 4th aspect of the present invention, a focus detection device, comprises: an image capture unit that has a plurality of light receiving units provided for each of a plurality of micro lenses, and that captures image by light from a subject that has passed through an optical system; a first focus detection unit that detects a focusing state of the optical system from deviation between a first image of the subject captured by the image capture unit due to light that has passed through a first pupil region of the optical system, and a second image of the subject captured by the image capture unit due to light that has passed through a second pupil region of the optical system, both these images being formed by a plurality of the micro lenses; and a second focus detection unit that detects the focusing state of the optical system according to a relative positional deviation of the images of the subject with respect to the micro lenses, with the images of the subject being created by each of the micro lenses and being captured by the image capture unit.

According to the 5th aspect of the present invention, it is preferred that in the focus detection device according to the 4th aspect, changeover is performed between detection of the focusing state of the optical system by the first focus detection unit and detection of the focusing state of the optical system by the second focus detection unit.

According to the 6th aspect of the present invention, it is preferred that in the focus detection device according to the 5th aspect, changeover is performed from the detection of the focusing state of the optical system by the first focal point detection unit to the detection of the focusing state of the optical system by the second focus detection unit.

According to the 7th aspect of the present invention, it is preferred that in the focus detection device according to the 6th aspect, the first focus detection unit calculates an amount of focus deviation of the optical system as the focusing state of the optical system, and, in case that the amount of focus deviation is greater than a predetermined threshold value, changeover is performed to the detection of the focusing state of the optical system by the second focus detection unit.

According to the 8th aspect of the present invention, it is preferred that in the focus detection device according to the 6th aspect, the first focus detection unit calculates an amount of focus deviation of the optical system as the focusing state of the optical system, and, in case that a reliability of the amount of focus deviation is smaller than a predetermined value, changeover is performed to the detection of the focusing state of the optical system by the second focus detection unit.

According to the 9th aspect of the present invention, it is preferred that in the focus detection device according to the 6th aspect, in case that the first focus detection unit has not been able to calculate an amount of focus deviation of the optical system as the focusing state of the optical system, changeover is performed to the detection of the focusing state of the optical system by the second focus detection unit.

According to the 10th aspect of the present invention, it is preferred that in the focus detection device according to the 5th aspect, changeover is performed from the detection of the focusing state of the optical system by the second focus detection unit to the detection of the focusing state of the optical system by the first focus detection unit.

According to the 11th aspect of the present invention, it is preferred that in the focus detection device according to the 10th aspect, the first focus detection unit calculates the amount of focus deviation of the optical system as the focusing state of the optical system, and, in case that the amount of focus deviation is less than or equal to a predetermined threshold value, changeover is performed to the detection of the focusing state of the optical system by the first focus detection unit.

According to the 12th aspect of the present invention, it is preferred that in the focus detection device according to the 10th aspect, the first focus detection unit calculates the amount of focus deviation of the optical system as the focusing state of the optical system, and, in case that a reliability of the amount of focus deviation is greater than or equal to a predetermined value, changeover is performed to the detection of the focusing state of the optical system by the first focus detection unit.

According to the 13th aspect of the present invention, it is preferred that in the focus detection device according to the 10th aspect, in case that the first focus detection unit is capable of calculating the amount of focus deviation of the optical system as the focusing state of the optical system, changeover is performed to the detection of the focusing state of the optical system by the first focus detection unit.

According to the 14th aspect of the present invention, it is preferred that in the focus detection device according to the 5th aspect, the detection of the focusing state of the optical system is performed by the first focus detection unit, and detection of the focusing state of the optical system is performed by the second focus detection unit.

According to the 15th aspect of the present invention, it is preferred that in the focus detection device according to the 14th aspect, the detection of the focusing state of the optical system is performed by one of the first focus detection unit and the second focus detection unit, which was initially able to detect the focusing state of the optical system.

According to the 16th aspect of the present invention, it is preferred that in the focus detection device according to the 14th aspect, the first focus detection unit and the second focus detection unit calculate an amount of focus deviation of the optical system as the focusing state of the optical system; and both the amount of focus deviation of the optical system calculated by the first focus detection unit and the amount of focus deviation of the optical system calculated by the second focus detection unit are taken as the amount of focus deviation of the optical system.

According to the 17th aspect of the present invention, it is preferred that in the focus detection device according to the 16th aspect, a weighted average of the amount of focus deviation of the optical system calculated by the first focus detection unit and the amount of focus deviation of the optical system calculated by the second focus detection unit is taken as the amount of focus deviation of the optical system.

According to the 18th aspect of the present invention, it is preferred that in the focus detection device according to the 1st or 2nd aspect, the focus detection unit calculates an amount of focus deviation of the optical system as the focusing state of the optical system.

According to the 19th aspect of the present invention, it is preferred that in the focus detection device according to any one of the 4th through 17th aspects, the first focus detection unit and the second focus detection unit calculate an amount of focus deviation of the optical system as the focusing state of the optical system.

According to the 20th aspect of the present invention, a focus detection device according to the 18th or 19th aspect may further comprise a focus adjustment unit that performs focus adjustment for the optical system according to the amount of focus deviation.

According to the 21st aspect of the present invention, a camera comprises the focus detection device according to any one of the 1st through 19th aspects.

According to the 22nd aspect of the present invention, a camera comprises the focus adjustment device according to the 20th aspect.

According to the 23rd aspect of the present invention, a focus detection device comprises: a plurality of micro lenses that are arranged so that a light flux that has passed through an image focusing optical system is incident thereupon; a plurality of photoreception element groups each of which comprises a plurality of photoreception elements, and that are arranged to correspond to each of the plurality of micro lenses; a first focus detection unit that, based upon the photoreception outputs output from the plurality of photoreception element groups, calculates an amount of image deviation between a first image of the subject due to light from the subject that has passed through a first pupil region of the image focusing optical system, and a second image of the subject due to light from the subject that has passed through a second pupil region of the image focusing optical system that is different from the first pupil region, and that detects a first defocusing amount of the image focusing optical system from the amount of image deviation, the second image of the subject relating to the same portion of the subject as the first image of the subject; a second focus detection unit that, based upon the photoreception outputs output from the plurality of photoreception element groups, calculates an amount of image deviation between a third image of the subject formed upon the photoreception element groups by a first micro lens among the plurality of micro lenses, and a fourth image of the subject formed upon the photoreception element groups by a second micro lens among the plurality of micro lenses that is different from the first micro lens, and that detects a second defocusing amount of the image focusing optical system from this amount of image deviation, the fourth image of the photographing subject relating to the same portion of the subject as the third image of the subject; and an output unit that outputs a third defocusing amount based upon the first defocusing amount detected by the first focus detection unit, and the second defocusing amount detected by the second focus detection unit.

According to the 24th aspect of the present invention, it is preferred that in the focus detection device according to the 23rd aspect, the output unit outputs the first defocusing amount as the third defocusing amount in case that the first defocusing amount is less than or equal to a predetermined threshold value and moreover a reliability of the first defocusing amount is greater than a predetermined threshold value, and in other cases outputs the second defocusing amount as the third defocusing amount.

According to the 25th aspect of the present invention, it is preferred that in the focus detection device according to the 23rd aspect, the output unit outputs a weighted average of the first defocusing amount and the second defocusing amount as the third defocusing amount.

According to the 26th aspect of the present invention, the focus detection device according to any one of the 23rd through 25th aspects may further comprise a focus adjustment unit that performs focus adjustment for the image focusing optical system based upon the third defocusing amount output by the output unit.

According to the 27th aspect of the present invention, a camera comprises the focus detection device according to any one of the 23rd through 25th aspects.

DESCRIPTION OF EMBODIMENTS

Embodiment #1

Figure 1:
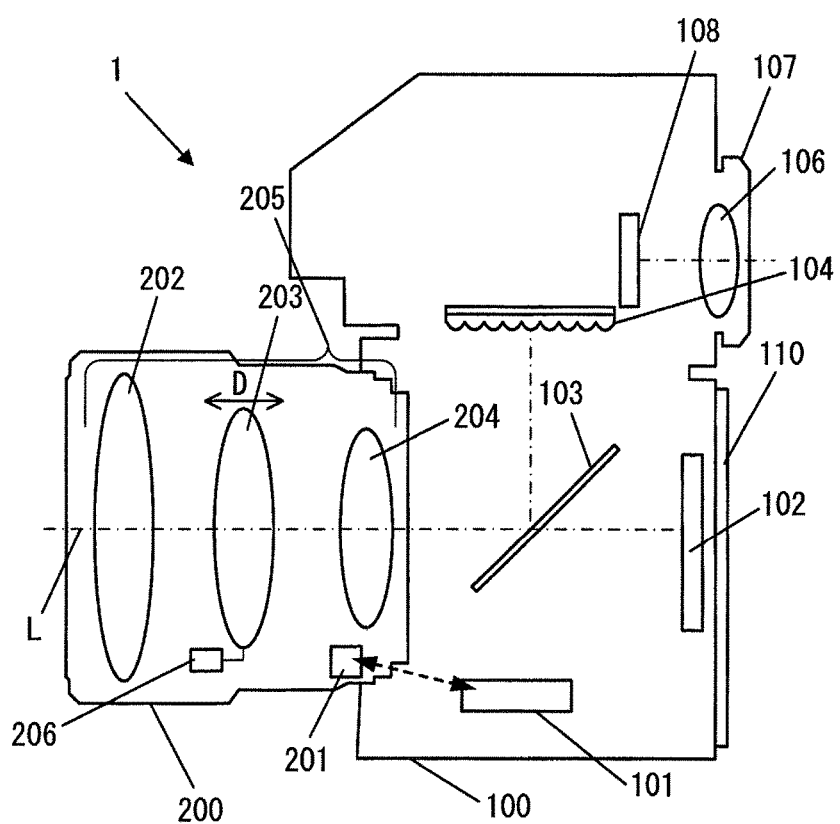
FIG. 1 is a sectional view showing an interchangeable lens type camera system to which the present invention is applied.

FIG. 1 is a sectional view showing an interchangeable lens type camera system to which the present invention is applied. A camera 1 comprises a camera body 100 and an interchangeable lens 200 that is detachable from the camera body 100.

An image focusing optical system 205 is provided to the interchangeable lens 200, and comprises a plurality of lenses 202, 203, and 204. A light flux from the subject passes through this image focusing optical system 205 and is incident into the camera body 100. It should be understood that, while in FIG. 1 the image focusing optical system 205 is shown as including three lenses, it would also be possible for it to include any number of lenses.

The lens 203 included in the image focusing optical system 205 is a focusing lens that adjusts the position of the focus of the image focusing optical system 205. This focusing lens 203 is connected to a lens drive device 206 via a drive mechanism not shown in the figures. The lens drive device 206 includes an actuator not shown in the figures such as a stepping motor or the like, and drives the focusing lens 203 along the optical axis L of the image focusing optical system 205 in the directions D.

The camera body 100 includes an imaging element 102 such as a CCD or a CMOS or the like that captures an image of the subject that has been focused by the image focusing optical system 205. This imaging element 102 is disposed so that the image surface thereof coincides with a predetermined focusing plane of the image focusing optical system 205. A half mirror 103 is installed within the camera body 100, between the image focusing optical system 205 and the image surface of the imaging element 102. This half mirror 103 may, for example, consist of a pellicle mirror or the like, and passes a portion of the light from the subject from the image focusing optical system 205 toward the imaging element 102, while reflecting the remaining portion thereof toward the upper portion of the camera body 100. This reflected light is incident upon a focus detection device 104 that is provided in the upper portion of the camera body 100. The structure of this focus detection device 104 will be described in detail hereinafter.

The camera body 100 comprises a body control device 101 that includes a microprocessor and peripheral circuitry thereof. The body control device 101 controls various sections of the camera body 100 by reading in and executing a predetermined control program that is stored in advance in a storage medium not shown in the figures. In a similar manner, the interchangeable lens 200 is provided with a control device 201 that includes a microprocessor and peripheral circuitry thereof. And this lens control device 201 controls various sections of the interchangeable lens 200 by reading in and executing a predetermined control program that is stored in advance in a storage medium not shown in the figures. It should be understood that it would also be acceptable to arrange to build the body control device 101 and/or the lens control device 201 as electronic circuits that perform operations that are equivalent to the control programs described above.

The body control device 101 and the lens control device 201 are adapted to be capable of performing mutual communication via electrical contact points not shown in the figures that are provided peripheral to the lens mount. For example, the body control device 101 may transmit drive commands for the focusing lens 203 and so on to the lens control device 201 by data communication via these electrical contact points. It should be understood that it would also be acceptable for this data communication to be performed by some method other than transfer of electrical signals via electrical contact points (for example, by wireless communication or optical communication or the like).

When a predetermined actuation for commanding focus adjustment is performed (for example, when a release switch not shown in the figures is half pressed), the focus detection device 104 detects the amount of defocusing of the image focusing optical system 205. Thereafter, the body control device 101 transmits a drive command to the lens control device 201 for driving the focusing lens 203 by an amount corresponding to the defocusing amount that has been output from the focus detection device 104. And, according to this drive command, the lens control device 201 drives the focusing lens 203 in the lens drive device 206. Due to this, the focus is adjusted for the predetermined subject.

A monitor 110 is provided on the rear surface of the camera 1, and comprises a display element such as, for example, a liquid crystal or the like. Using this monitor 110, the body control device 101 performs, for example, replay of still image data and/or movie data that have been photographed, display of menus for setting photographic parameters for the camera 1 (aperture value, shutter speed, and the like), display of through images, and so on.

An electronic viewfinder unit 108 is installed at the upper portion of the camera body 100, and includes a display element such as a liquid crystal display or the like. The photographer is able visually to check an image of a subject or the like that is being displayed upon the display element of the electronic viewfinder unit 108 from the viewfinder unit 107 via an eyepiece lens 106. While the camera 1 is set to its photographic mode, the body control device 101 captures images of the subject upon the imaging element 102 at predetermined intervals (for example one every sixtieth of a second), creates a live view image based upon this image capture signal, and displays this live view image upon the monitor 110 and the electronic viewfinder unit 108.

When, during the photographic mode, a predetermined actuation for commanding still image photography is performed (for example, when the release switch not shown in the figures is full pressed), the body control device 101 performs control for photography. At this time, the body control device 101 controls a shutter or the like not shown in the figures, and captures an image of the subject upon the imaging element 102. And image processing of various types is performed upon the image capture signal output from the imaging element 102, so as to create still image data that is then stored upon a storage medium not shown in the figures (for example, upon a memory card or the like).

Explanation of the Focus Detection Device 104

Figure 2:
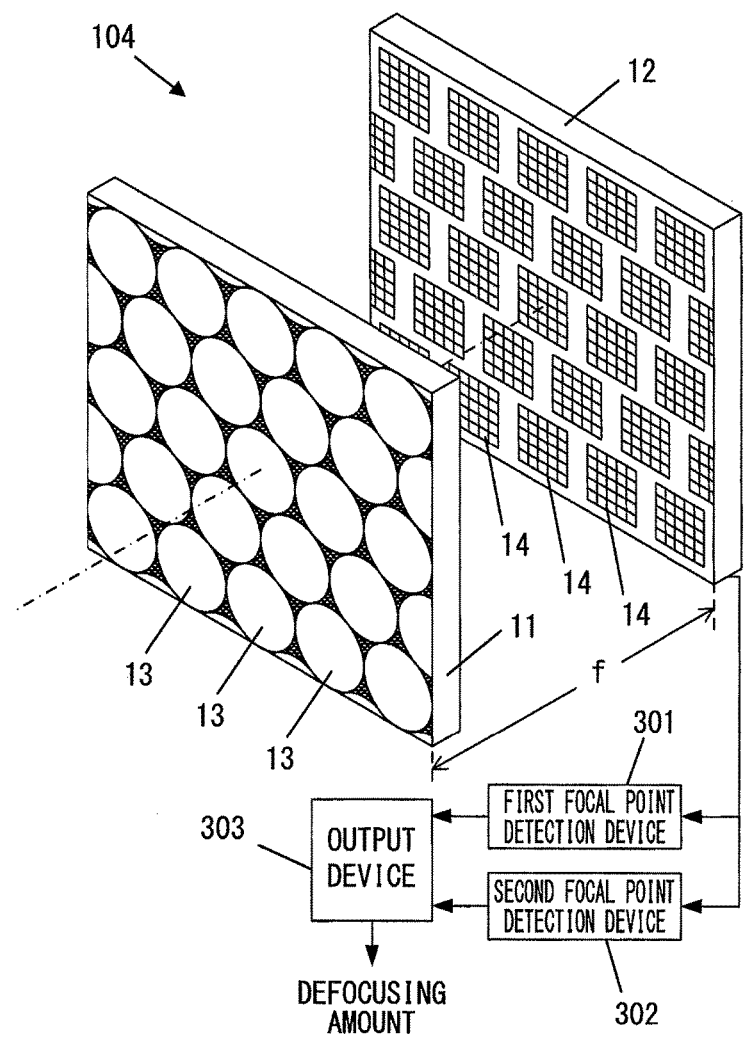
FIG. 2 is a perspective view of a focus detection device 104.

FIG. 2 is a perspective view of the focus detection device 104. This focus detection device 104 comprises a micro lens array 11 and a photoreception element array 12 that is provided behind the micro lens array 11.

In this micro lens array 11, a large number of micro lenses 13 are arranged two-dimensionally in a triangular pattern. Here the term "triangular arrangement" means that the micro lenses 13 in odd numbered rows and even numbered rows are arranged so as to be shifted along by the row by a half pitch. In the following explanation, it will be supposed that each of the micro lenses 13 has focal length f and diameter d. And, for example, the pitch of the micro lenses 13 in the micro lens array 11 may be d.

Light from the subject that has been reflected by the half mirror 103 passes through each of the micro lenses 13 and is incident upon the photoreception surfaces of the photoreception element array 12. A large number of photoreception element groups 14, upon each of which a light flux that has passed through one of the micro lenses 13 is incident, are arranged in a two-dimensional pattern upon the photoreception surface of the photoreception element array 12 (i.e. upon the side thereof at which the micro lens array 11 is disposed). Each single one of the photoreception element groups 14 is made up of a total of 25 photoreception elements, arranged in a five row five column array. In other words, a light flux that has passed through a single one of the micro lenses 13 is incident upon one of the photoreception element groups 14, so that the plurality of photoreception elements that make up this photoreception element group 14 receive the light of this light flux.

Places on the front surface of the micro lens array 11 where no micro lenses 13 are present (i.e. on its surface upon which the light from the subject is incident) are covered by a light shielding mask. Accordingly, no part of the light flux that has not passed through the micro lenses 13 is incident upon the photoreception element array 12.

The photoreception element array 12 is disposed in a position that is separated from the micro lens array 11 by the focal length f of the micro lenses 13. In other words, the distances from the tops of the micro lenses 13 to the photoreception surfaces of the photoreception element array 12 are equal to the focal length f. In FIG. 2, for convenience, the gap between the micro lens array 12 and the photoreception element array 12 is shown as exaggerated, as compared to its real size.

This focus detection device 104 is arranged so that the predetermined focusing plane of the image focusing optical system 205 (refer to FIG. 1) and the tops of the micro lenses 13 on the side of the image focusing optical system 205 approximately coincide. To put this in another manner, the photographic image surface of the imaging element 102 (refer to FIG. 1) and the micro lens array 11 are in a conjugate positional relationship with respect to the exit pupil of the image focusing optical system 205.

It should be understood that only portions of the micro lens array 11 and of the photoreception element array 12 are shown in FIG. 2. Actually, much larger numbers of the micro lenses 13 and of the photoreception element groups 14 are present. Moreover, the number of photoreception elements that are included in a single one of the photoreception element groups 14 could be made to be greater than or less than 25, and the arrangement thereof could also be different from that shown in FIG. 2.

A first focus detection device 301 and a second focus detection device 302 are connected to the photoreception element array 12. The first focus detection device 301 and the second focus detection device 302 detect the amount of defocusing of the image focusing optical system 205 (refer to FIG. 1) by mutually different methods. The focus detection device 104 also includes an output device 303. This output device 303 determines a final defocusing amount on the basis of the defocusing amounts detected by each of the first focus detection device 301 and the second focus detection device 302, and outputs this final defocusing amount to the body control device 101 (refer to FIG. 1). The focus detection methods employed by the first focus detection device 301 and the second focus detection device 302 will now be explained.

Explanation of the First Focus Detection Device 301

As will be described below in detail, on the basis of the photoreception outputs that are output from the plurality of photoreception element groups 14, the first focus detection device 301 calculates an amount of image deviation between a first image of the subject that is produced due to light from the subject that has passed through a first pupil region of the image focusing optical system 205, and a second image of the subject, which relates to the same portion of the subject as the first image of the subject, and which is produced due to light from the subject that has passed through a second pupil region of the image focusing optical system 205 that is different from the first pupil region, and detects the defocusing amount of the image focusing optical system 205 from this amount of image deviation.

FIG. 3(a) is a figure in which photoreception element groups 14 in one column that is employed for focus detection have been extracted from the large number of photoreception element groups 14 shown in FIG. 2. While five of the photoreception element groups 14 are shown in FIG. 3(a), actually it is desirable for a larger number of photoreception element groups 14 to be selected. In the following, the photoreception element groups 14 that are employed in this explanation will be individually referred to as the photoreception element groups 14a through 14e.

And FIG. 3(b) is a figure schematically showing the relationship between the photoreception element groups 14a through 14e shown in FIG. 3(a) and corresponding focus detection pupils. The micro lenses 13a through 13e are arranged so that their tops roughly coincide with the predetermined focusing plane 17 of the image focusing optical system 205. The shapes of the pair of photoreception elements 16lc and 16rc, which are disposed to the rear of the micro lens 13c, are projected onto the exit pupil 20 which is separated by a projection distance 18 from the micro lens 13c, and their projected shapes form focus detection pupils 21 and 22. This projection distance 18 is a distance that is determined according to the curvature of the micro lens 13c, its refractive index, the distance between the micro lens 13c and the photoreception element array 12, and so on. The pair of focus detection pupils 21, 22 and the pair of photoreception elements 16lc, 16rc are in a conjugate relationship via the micro lens 13c.

It should be understood that although, in the above explanation, for the sake of convenience, an example was shown of a pair of photoreception elements 16lc, 16rc and a pair of focus detection pupils 21, 22 belonging to a photoreception element group 14c that was upon the optical axis L, even in the case of a photoreception element group that is positioned away from the optical axis L, a pair of photoreception elements respectively receive light fluxes arriving at their micro lenses from a corresponding pair of focus detection pupils.

The photoreception element 16lc outputs an optical reception signal corresponding to the intensity of the image formed upon the micro lens 13c by the focus detection light flux 24 that passes through the focus detection pupil 22 toward the micro lens 13c. In a similar manner, the photoreception element 16rc outputs an optical reception signal corresponding to the intensity of the image formed upon the micro lens 13c by the focus detection light flux 23 that passes through the focus detection pupil 21 toward the micro lens 13c.

Accordingly, by obtaining the photoreception outputs of the pair of photoreception elements corresponding to the focus detection pupil 21 and to the focus detection pupil 22 from each of the plurality of photoreception element groups 14a through 14e that are arranged in a straight line shape as shown in FIG. 3(a), information is received relating to the intensity distribution of the pair of images that the focus detection light fluxes that pass through each of the focus detection pupil 21 and the focus detection pupil 22 form upon the photoreception element array 12. And, if per se known image deviation detection calculation is performed upon this information, then the amount of image deviation of the pair of images can be detected by a so called split pupil phase difference detection method. Furthermore a defocusing amount, which is the current deviation of the image forming surface with respect to the predetermined focusing plane 17, may be calculated by performing conversion calculation corresponding to the barycenter interval of the pair of focus detection pupils 21, 22 upon the amount of image deviation.

To explain this image deviation detection calculation and this conversion calculation in concrete terms, first, for the photoreception element group 14a, the first focus detection device 301 obtains a value a(1) by adding together the photoreception outputs of the three photoreception elements 16la at the center of its left edge. In a similar manner, for each of the photoreception element groups 14b through 14e, values a(2) through a(5) are obtained by adding together, respectively, the photoreception outputs of the three photoreception elements 16lb through 16le at the centers of their left edges. Next, for each of the photoreception element groups 14a through 14e, in a similar manner, values b(1) through b(5) are obtained by adding together, respectively, the photoreception outputs of the three photoreception elements 16ra through 16re at the centers of their right edges. The pair of signal sequences a(i) and b(i) that have been generated in this manner are information related to the pair of image intensity distributions described above. The first focus detection device 301 performs correlation calculation between the pair of signal sequences a(i) and b(i) while displacing them with respect to one another a little at a time, and calculates the correlation amount for each of these amounts of deviation. And, from these results, the amount of deviation for which the correlation amount becomes least (i.e. the amount of deviation for which the correlation becomes a local maximum) is obtained. The first focus detection device 301 calculates the defocusing amount of the image of the subject from the predetermined focusing plane 17 by multiplying this amount of deviation by a predetermined conversion coefficient.

It should be understood that the row of photoreception element groups 14 that is selected for focus detection from among the large number of photoreception element groups 14 may be determined by any appropriate method. For example, it may be arranged to make the user designate a position in the subject to which he wishes to adjust the focus, and to select photoreception element groups 14 that are in that position; or it may also be arranged to select photoreception element groups 14 that are positioned in some manner that has been determined in advance, such as in the center of the photographic scene or the like.

Explanation of the Second Focus Detection Device 302

As described in detail below, on the basis of the photoreception outputs output from the plurality of photoreception element groups 14, the second focus detection device 302 calculates the amount of image deviation between a third image of the subject that is formed upon the photoreception element group 14 by a first micro lens among the plurality of micro lenses 13 and a fourth image of the subject, relating to the same portion of the subject as this third image of the subject, that is formed upon the photoreception element group 14 by a second micro lens among the plurality of micro lenses 13 that is different from the first micro lens among the plurality of micro lenses 13, and detects the defocusing amount of the image focusing optical system 205 from this amount of image deviation.

Figure 3:
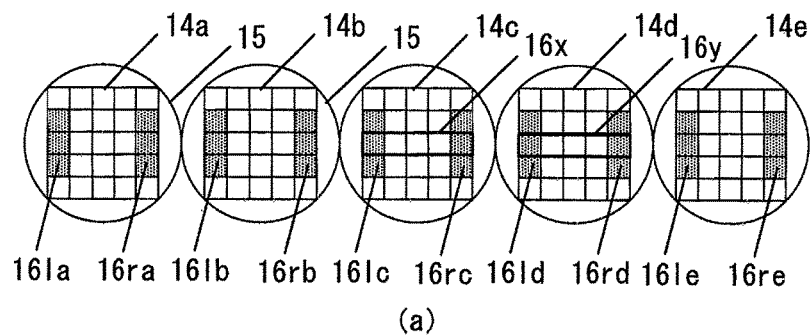
FIG. 3 is a figure for explanation of a focus detection method performed by a first focus detection device 301.
Figure 3:
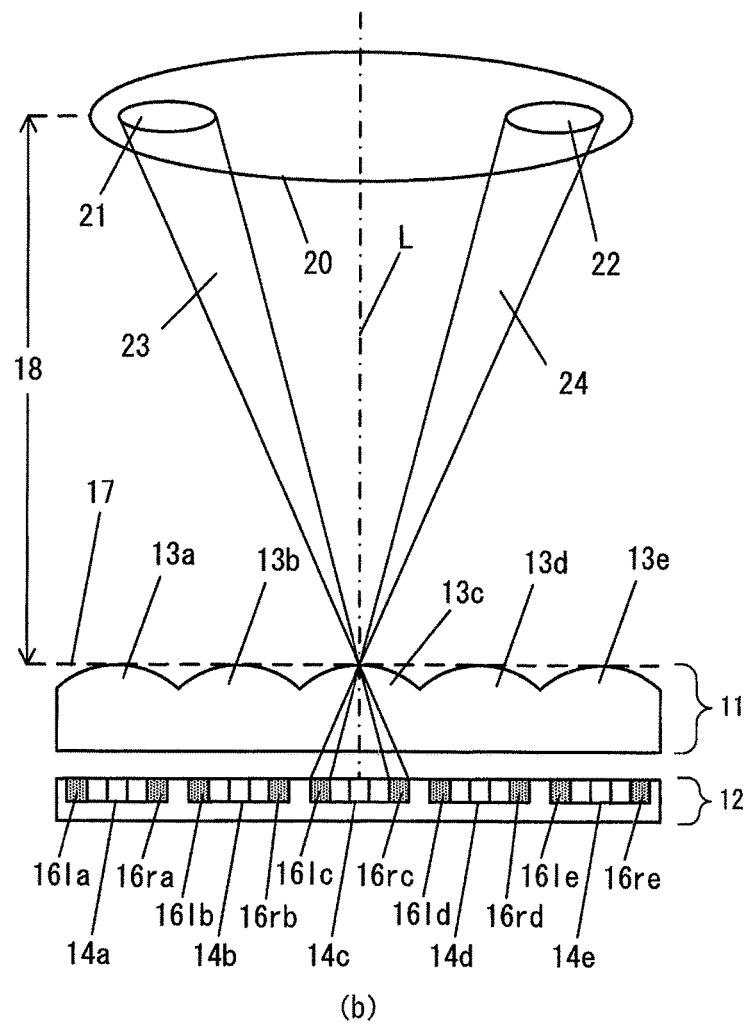
Figure 4:
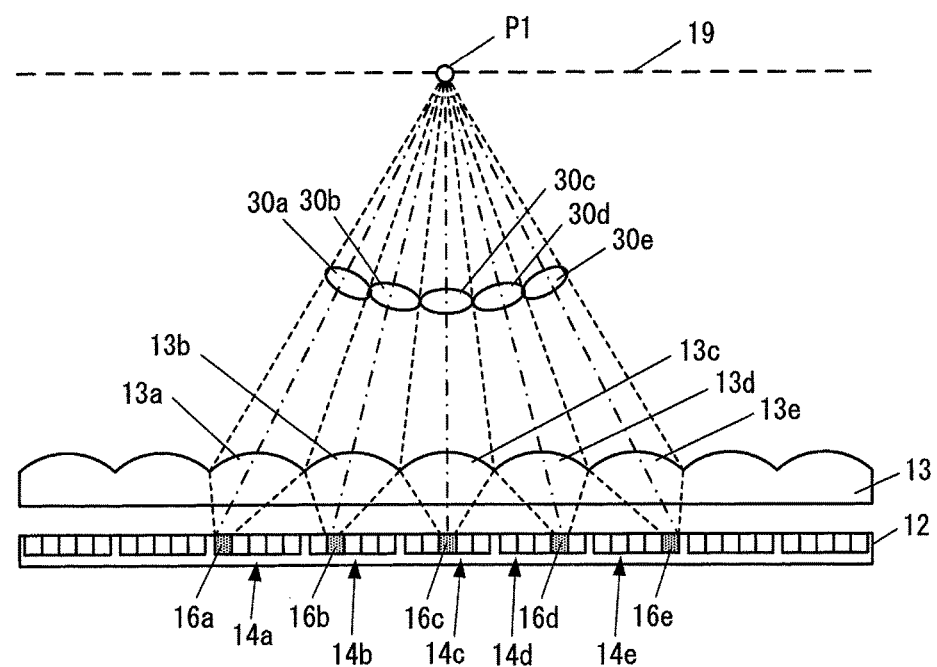
FIG. 4 is a figure for explanation of a focus detection method performed by a second focus detection device 302.

FIG. 4 is a figure schematically showing the relationship between the image forming surface 19 and the photoreception element group 14, when the image forming surface 19 is separated from the predetermined focusing plane by a significant distance. If the image forming surface 19 is significantly separated from the predetermined focusing plane 17 (refer to FIG. 3), in other words from the tops of the micro lenses 13, then an image of the subject is formed upon each of the photoreception element groups 14 by each of the micro lenses 13. At this time, each of the images of the subject that is formed by each of the micro lenses 13 has a parallax corresponding to the position of that micro lens 13.

For example, in FIG. 4, a single point P1 that is upon the image forming surface 19 will be considered. Light from the subject that passes through the image focusing optical system 205 and is focused at the point P1 passes the point P1 and is incident upon the plurality of micro lenses 13a through 13e. Among this light from the subject, the subject light 30c directed toward the micro lens 13c is incident upon the photoreception element 16c within the photoreception element group 14c via the micro lens 13c. This photoreception element 16c is positioned in the center of its photoreception element group 14c.

By contrast, the subject light 30b directed toward the micro lens 13b one to the left is incident upon the photoreception element 16b within the photoreception element group 14b via the micro lens 13b. This photoreception element 16b is positioned one to the left from the center of its photoreception element group 14b. And the subject light 30a directed toward the micro lens 13a two to the left from the micro lens 13c is incident upon the photoreception element 16a within the photoreception element group 14a via the micro lens 13a. This photoreception element 16a is positioned two to the left from the center of its photoreception element group 14a.

In this manner, the light from the subject that defines the point P1 is collected into positions upon the photoreception element groups 14 that correspond to the relative positions of the micro lenses 13. The amounts of deviation of the positions of incidence upon the photoreception element groups 14 in this case, in other words the amounts of image deviation of the images of the subject created by the micro lenses 13, change according to the position of the image forming surface 19. In concrete terms, when the image forming surface 19 is close to the predetermined focusing plane 17, the amounts of image deviation become great; while, when the image forming surface 19 is further away from the predetermined focusing plane 17, the amounts of image deviation become small.

The second focus detection device 302 calculates the amount of defocusing of the image focusing optical system 205 by utilizing the theory described above. For example, for the pair of photoreception element groups 14c, 14d that are mutually adjacent, first the photoreception element columns 16x, 16y (refer to FIG. 3(a)) that are arranged in columns in adjacent directions are selected. Here, the photoreception outputs from the pair of photoreception element columns 16x, 16y will be referred to as the pair of signal sequences c(i) and d(i). And a differential column e(i) between the pair of signal sequences c(i) and d(i) is generated according to the following Equation (1):

[Math. 1]

$$e(i) = \sum_j |c(j+i) - d(j)| \quad (1)$$

Equation (1) above is an equation for calculating the level to which the signal sequences c and d agree with one another, when these signal sequences are displaced in the mutually neighboring direction by just i values. The second focus detection device 302 finds the minimum values from the differential columns e(i) that are generated while changing i through a fixed range (for example from −5 to +5). Thereafter, by a per se known interpolation method, the second focus detection device 302 calculates the position at which the difference between the signal sequences becomes a minimum, in other words the amount of image deviation. When the amount of image deviation that has been calculated in this manner is termed x, the defocusing amount Y can be calculated according to the following Equation (2). Here, f is the focal length of the micro lenses 13, and d is the pitch of the micro lenses 13.

$$Y = fd/x \quad (2)$$

It should be understood that it is not necessary for this comparison of signal sequences to be performed between photoreception element groups 14 that are mutually adjacent. For example, it would also be possible to perform comparison of signal sequences for photoreception element groups 14 that are one apart. In this case, the distance between the photoreception element groups 14 at this time becomes a base line length. In other words, by performing the calculation described above for photoreception element groups 14 that are separated from one another, it becomes possible to operate successfully, even if the amount of image deviation is large. For example, it would also be possible to build the second focus detection device 302 so that, first, the calculation described above is performed with photoreception element groups 14 that are mutually adjacent, and so that then, if the reliability of the defocusing amount Y that has been calculated in this manner is low, the calculation described above is performed again with photoreception element groups 14 that are more separated.

In this manner, by contrast to the fact that the first focus detection device 301 detects the defocusing amount by generating the pair of signal sequences a(i) and b(i) by collecting them while mutually shifting the optical reception signals from the large number of micro lenses 13 a little bit at a time, the second focus detection device 302 detects the defocusing amount by directly comparing the images generated by the pair of photoreception element groups 14c and 14d. In other words, the second focus detection device 302 obtains the positional deviation relating to the micro lenses 13 from the differences between the output data of the photoreception element groups 14c, with a plurality of the photoreception element groups 14c being provided to the micro lens 13c, and the output data of the photoreception element column groups 14d, with a plurality of the photoreception element groups 14d being provided to the micro lens 13d. In concrete terms, the second focus detection device 302 obtains the positional deviation with respect to the micro lenses 13 from the differences in the amounts of displacement, with the differences obtained while changing the amount i of displacement of the output data of the photoreception element group 14d with respect to the output data of the photoreception element group 14 being minimum.

Explanation of the Output Device 303

With the first focus detection device 301 described above there is the characteristic that it is possible to perform focus detection at high accuracy if the image forming surface 19 (refer to FIG. 4) is close to the predetermined focusing plane 17 (refer to FIG. 3), while the accuracy of focus detection decreases as the image forming surface 19 becomes further from the predetermined focusing plane 17. This is because, when the image forming surface 19 becomes further from the predetermined focusing plane 17, the pair of signal sequences a(i), b(i) for detection of the phase difference become flat, so that it becomes difficult to calculate the amount of image deviation by correlation calculation.

On the other hand, conversely to the above situation, with the second focus detection device 302 described above, there is the characteristic that the accuracy of focus detection is low when the image forming surface 19 (refer to FIG. 4) is close to the predetermined focusing plane 17 (refer to FIG. 3), while the accuracy of focus detection becomes high when the image forming surface 19 is further from the predetermined focusing plane 17 than a fixed distance. This is because the images of the subject formed by the micro lenses 13 upon the photoreception element groups 14 become more blurred, the closer the image forming surface 19 is to the predetermined focusing plane 17.

In this manner, the characteristics of the first focus detection device 301 and the second focus detection device 302 are mutually opposite. Thus, on the basis of the result of focus detection by the first focus detection device 301 and the result of focus detection by the second focus detection device 302, the output device 303 always outputs a highly accurate defocusing amount, without any dependence upon the distance between the image forming surface 19 (refer to FIG. 4) and the predetermined focusing plane 17 (refer to FIG. 3). In other words, changing over is performed between detection of the focusing state of the image focusing optical system 205 by the first focus detection device 301, and detection of the focusing state of the image focusing optical system 205 by the second focus detection device 302.

In concrete terms, first, the output device 303 causes the first focus detection device 301 to calculate the amount of defocusing. And if the defocusing amount that has been calculated in this manner is greater than a predetermined threshold value, or if the reliability of the defocusing amount that has been calculated in this manner is less than some fixed level, or if it has not been possible to calculate the defocusing amount in this manner, then the output device 303 causes the second focus detection device 302 to calculate the amount of defocusing, and then outputs this defocusing amount as the final defocusing amount. In other words, in this case, changeover is performed from detection of the focusing state of the image focusing optical system 205 with the first focus detection device 301 to detection of the focusing state with the second focus detection device 302. On the other hand, if the defocusing amount that has been calculated by the first focus detection device 301 is less than or equal to the predetermined threshold value and moreover has reliability greater than or equal to the fixed level, then this defocusing amount is output as the final defocusing amount. It should be understood that if, in the previous processing, the defocusing amount that was calculated by the second focus detection device 302 was output as the final defocusing amount, then if, in this processing, the defocusing amount that is calculated by the first focus detection device 301 is greater than or equal to the predetermined threshold value and moreover has a reliability greater than or equal to the fixed level, the final defocusing amount is changed over to calculation by the first focus detection device 301. To put this in another manner, changeover is made from detection of the focusing state of the image focusing optical system 205 with the second focus detection device 302 to detection of the focusing state of the image focusing optical system 205 with the first focus detection device 301.

Explanation of the Focus Adjustment Control

Figure 5:
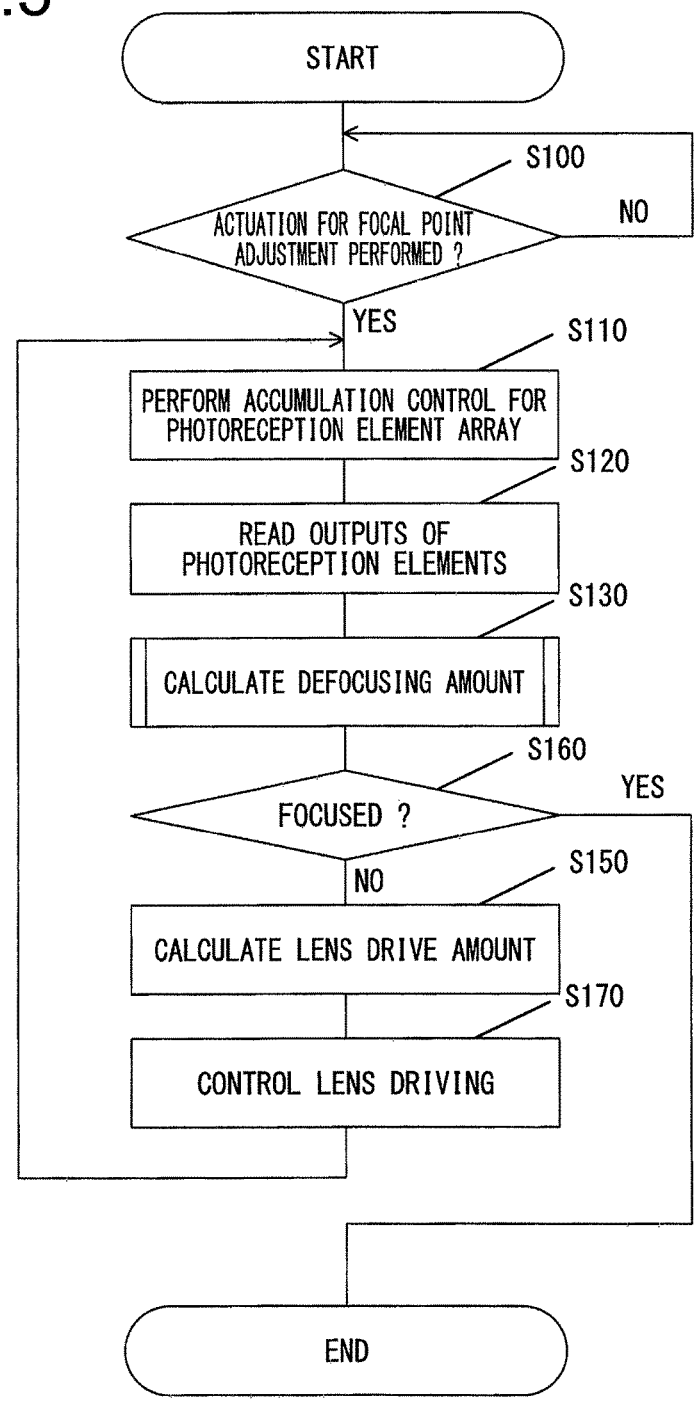
FIG. 5 is a flow chart for focus adjustment control performed by a body control device 101.

FIG. 5 is a flow chart showing the focus adjustment control that is performed by this body control device 101. The processing shown in FIG. 5 is included in a control program that the body control device 101 reads in from a memory not shown in the figures and executes.

First, in step S100, the body control device 101 makes a decision as to whether or not predetermined actuation for commanding focus adjustment (for example, half press actuation of the release switch) has been performed by the user. The body control device 101 repeatedly executes this step S100 until focus adjustment actuation is performed, and then proceeds to step S110 when focus adjustment actuation has been performed. In this step S110, the body control device 101 performs accumulation control for the photoreception element array 12, and then reads out the photoreception outputs of the photoreception element groups 14 in step S120.

Then in step S130 the body control device 101 calculates the amount of defocusing for the focus detection device 104. And in step S160 a decision is made as to whether or not it is necessary to drive the focusing lens 203, in other words as to whether or not the focused state has already been established, and if the focused state has been established then the processing of FIG. 6 terminates. On the other hand, if the focused state has not yet been established, then the flow of control proceeds to step S150, in which the drive amount for the focusing lens 203 that is required for focusing is calculated from the defocusing amount that has been calculated. And in step S170 the body control device 101 drives the focusing lens 203 by this drive amount that has been calculated. In concrete terms, the body control device 101 transmits a drive command to the lens control device 201 so as to drive the focusing lens 203 by the lens drive amount that was calculated in step S150. And the lens control device 201 drives the focusing lens 203 with the lens drive device 206 according to this drive command. Thereafter, the body control device 101 transfers the flow of control to step S110.

Figure 6:
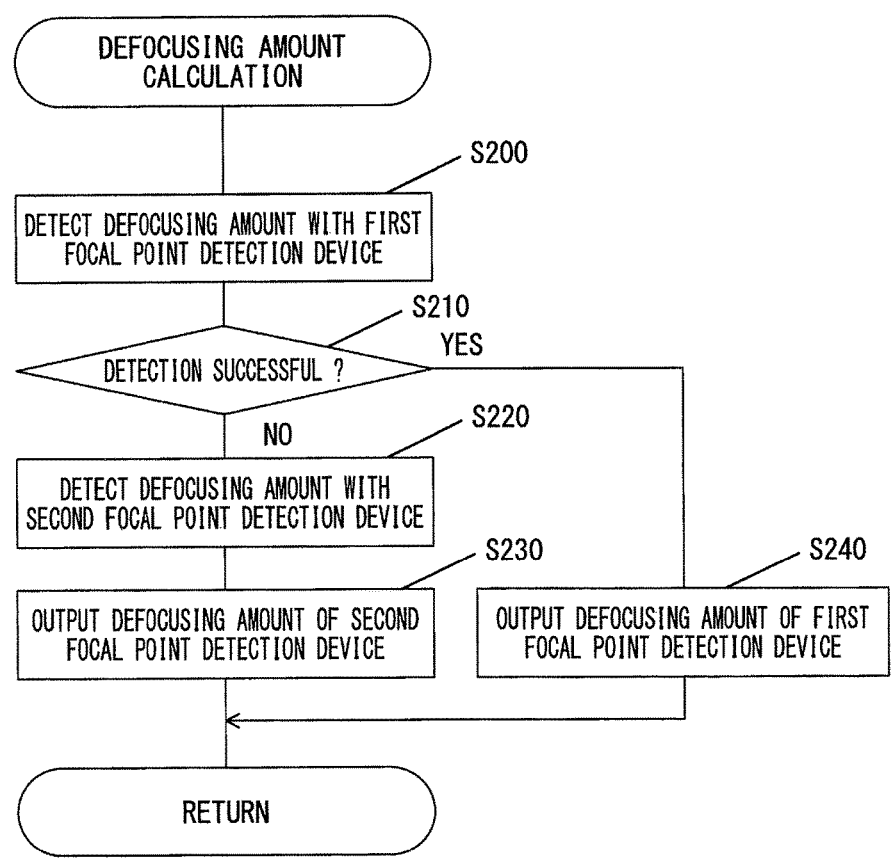
FIG. 6 is a flow chart for defocusing amount calculation processing.

FIG. 6 is a flow chart that is called from step S130 of FIG. 5 for defocusing amount calculation processing. First in step S200 the first focus detection device 301 calculates a defocusing amount on the basis of the photoreception outputs read out in step S120 of FIG. 5. Then in step S210 the output device 30 makes a decision as to whether or not this defocusing amount that has been calculated in step S200 is less than or equal to a predetermined threshold value and moreover has reliability greater than or equal to a fixed level. If a defocusing amount of this type has been successfully calculated, then the output device 303 transfers the flow of control to step S240. In this step S240, the output device 303 outputs this defocusing amount that has been calculated in step S200 by the first focus detection device 301 to the body control device 101 as the final defocusing amount. On the other hand, if no such defocusing amount as described above has been successfully calculated in step S200, then the output device 303 transfers the flow of control to step S220.

In this step S220, the second focus detection device 302 calculates a defocusing amount on the basis of the photoreception outputs read out in step S120 of FIG. 5. And then in step S230 the output device 303 outputs this defocusing amount that has been calculated in step S220 by the second focus detection device 302 to the body control device 101 as the final defocusing amount.

According to the camera system of the first embodiment described above, the following beneficial operational effects are obtained.

(1) On the basis of the photoreception outputs output from the plurality of photoreception element groups 14, the first focus detection device 301 calculates the amount of image deviation between the first image of the subject due to the light 23 from the subject that has passed through the first pupil region 21 of the image focusing optical system 205 and the second image of the subject due to the light 24 from the subject that has passed through the second pupil region 22 of the image focusing optical system 205, and detects the defocusing amount of the image focusing optical system 205 from this amount of image deviation. And, on the basis of the photoreception outputs output from the plurality of photoreception element groups 14, the second focus detection device 302 calculates the amount of image deviation between the third image of the subject formed upon the photoreception element group 14b by the first micro lens 13b among the plurality of micro lenses 13 and the fourth image of the subject formed upon the photoreception element group 14c by the second micro lens 13c among the plurality of micro lenses 13, and detects the defocusing amount of the image focusing optical system 205 from this amount of image deviation. And the output device 303 outputs the final defocusing amount on the basis of the defocusing amount detected by the first focus detection device 301 and the defocusing amount detected by the second focus detection device 302. Since these arrangements are provided, accordingly it is possible to perform focus detection with high accuracy.

(2) If the defocusing amount that has been detected by the first focus detection device 301 is less than or equal to the predetermined threshold value and moreover its reliability is greater than or equal to the predetermined threshold value, then the output device 303 outputs the defocusing amount detected by the first focus detection device 301 as the final defocusing amount, while in other cases it outputs the defocusing amount detected by the second focus detection device 302 as the final defocusing amount. Since these arrangements are provided, accordingly it is possible to perform focus detection with high accuracy.

The following variations are also to be considered as coming within the scope of the present invention; and one or more of these variant embodiments may also be combined with the first embodiment described above.

Variant Embodiment #1

While, in FIG. 3, an example was shown of a situation in which five photoreception element groups 14a through 14e arranged along the horizontal direction were selected for focus detection, it would also be acceptable to arrange to select photoreception element groups 14 that are arranged in a row in a different direction. Moreover, it would also be acceptable to arrange to select more, or fewer, than five of the photoreception element groups 14; and it would also be possible for the photoreception element groups 14 that are selected not to be in a continuous sequence. For example, it would be possible to arrange to select every second photoreception element group 14 in a sequence.

Furthermore during focus detection, it would also be acceptable to arrange to select the photoreception elements that are selected in order to generate the pair of signal sequences from three of the photoreception elements to be other than the three photoreception elements at the left and right edges, as shown in FIG. 3(a). Moreover, pixel addition need not necessarily be performed. In other words, while in FIG. 3(a) each of the values a(1), a(2) and so on is generated by adding together the photoreception outputs from three of the photoreception elements, it would also be possible to employ the photoreception output of a single photoreception element for a(1), a(2) and so on.

Variant Embodiment #2

It would also be acceptable for the micro lens array 11 and the photoreception element array 12 to be constructed differently from those shown in FIG. 2. For example, the arrangement of the micro lenses 13 and the photoreception element groups 14 may be set up according to a different arrangement method from the arrangement shown in FIG. 2, such as a square array or the like. Moreover, the shape of the micro lenses 13 need not necessarily be circular; it would be possible to employ a different shape (for example, a hexagonal shape or the like). Furthermore, it would also be possible for the arrangement of the photoreception elements making up each of the photoreception element groups 14 to be other than a square array. For example, it would be possible to arrange the photoreception elements so that the photoreception element groups 14 are formed in shapes that are close to circles, thus matching the shapes of the corresponding micro lenses 13; or it would also be possible to arrange the photoreception elements in horizontal rows or vertical rows or the like. Apart from the above, it would also be possible to omit the light shielding mask between the micro lenses 13.

Moreover, it would also be acceptable for the photoreception element groups 14 not to be mutually independent as shown in FIG. 2. In other words, it will be sufficient for a large number of photoreception elements to be tiled in the photoreception element array 12 in a two dimensional manner. In this case, the plurality of photoreception elements that are covered by a single micro lens 13 may be treated as a single photoreception element group 14.

Variant Embodiment #3

It would also be possible to apply the present invention to a so-called single lens reflex camera that is provided with a quick return mirror. In this case, a sub-mirror may be provided upon the rear surface of the quick return mirror, the quick return mirror may be built so that a portion of the light from the subject that is incident upon the quick return mirror passes through the quick return mirror and is incident upon the sub-mirror, and this light from the subject that is reflected by the sub-mirror may be incident upon the focus detection device 104. Moreover, like the focus detection device 104, the imaging element may be built to include a micro lens array 11 and a photoreception element array 12, and it may be arranged for both focus detection and also still image capture to be performed by this photoreception array 12.

Variant Embodiment #4

The method by which the output device 303 determines the final defocusing amount may also be different from that shown in the embodiment described above. For example, it would also be acceptable to arrange for a defocusing amount Y that is obtained, according to the following Equation (3), as the weighted average of the defocusing amount calculated by the first focus detection device 301 (hereinafter referred to as $y_1$) and the defocusing amount calculated by the second focus detection device 302 (hereinafter referred to as $y_2$) to be taken as the final defocusing amount:

$$Y = t y_1 - (1-t) y_2 \qquad (3)$$

The weighting t in Equation (3) above may, for example, be obtained in the following manner. If the closest range distance of the image focusing optical system 205 is termed $y_0$ and the focal length of the image focusing optical system 205 is termed $f_0$, then, from infinity to the closest range, the image surface distance h is compressed as shown by the following Equation (4):

[Math. 2]

$$h = \frac{f_0^2}{y_0 - f_0} \qquad (4)$$

The image forming surface 19 that is to be obtained (refer to FIG. 4) is within this image surface distance h. Accordingly, the weighting t may be obtained according to the following Equation (5). It should be understood that $y_h$ in the following Equation (5) is a provisional defocusing amount for determining the weighting t, and may represent either one of the defocusing amount $y_1$ calculated by the first focus detection device 301 and the defocusing amount $y_2$ calculated by the second focus detection device 302.

[Math. 3]

$$t = \left| 1 - \frac{y_h}{h} \right| \qquad (5)$$

It would also be acceptable to obtain the weighted average of the two defocusing amounts according to the following Equation (6), instead of Equation (3) above. In Equation (6) below, the defocusing amount in Equation (3) above is replaced by the reciprocal of the defocusing amount. Since the accuracy of the defocusing amount is linear with respect to the reciprocal of the defocusing amount, accordingly, if this method is adopted, it is possible to calculate the weighted average more accurately.

[Math. 4]

$$\frac{1}{Y} = \frac{t}{y_1} - \frac{1-t}{y_2} \quad (6)$$

The output device 303 may also be built to determine the final defocusing amount by some method other than those described above. For example it would be possible, not simply to calculate a weighted average of the defocusing amounts, but to correct one of the defocusing amounts according to the other defocusing amount.

Furthermore, it would also be possible for the focus detection device 104 to perform detection by false focusing. As described above, during the state in which the defocusing amount can be calculated with good accuracy by the first focus detection device 301, it is considered that the second focus detection device 302 is in the state of not being able to calculate a defocusing amount, and vice versa. Thus, for example, even when a detection result to the effect that focusing is correct is obtained by one of the first focus detection device 301 and the second focus detection device 302, if a defocusing amount having a fixed level of reliability has been calculated by the other thereof, then it is possible to determine that the former detection result is a case of false focusing.

Variant Embodiment #5

While in the first embodiment, as shown in the FIG. 3 example, an example was shown in which the predetermined focusing plane 17 approximately coincided with the tops of the micro lenses 13, the present invention should not be considered as being limited to this type of embodiment. In other words, it would also be acceptable to arrange to set the predetermined focusing plane 17 to a position that is substantially separated from the tops of the micro lenses 13.

The present invention is not to be considered as being limited to the embodiments described above; provided that the distinctive characteristics of the present invention are not lost, other forms of implementation that are deemed to come within the scope of the technical concept of the present invention are also to be understood as being included within the range of the present invention.

The content of the disclosure of the following application, upon which priority is claimed, is hereby incorporated herein by reference:
Japanese Patent Application 13,483 of 2014 (filed on 28 Jan. 2014).

REFERENCE SIGNS LIST

1: camera, 100: camera body, 101: body control device, 102: imaging element, 103: half mirror, 104: focus detection device, 106: eyepiece lens, 108: electronic viewfinder unit, 110: monitor, 200: interchangeable lens, 201: lens control device, 202, 204: lenses, 203: focusing lens, 205: image focusing optical system, 206: lens drive device, 301: first focus detection device, 302: second focus detection device, 303: output device.

The invention claimed is:
1. A focus detection device comprising:
an image capture unit that has a plurality of lenses and a plurality of light receiving units provided for each of the plurality of lenses, and that captures an image by light from a subject that has passed through an optical system;
a detection unit that detects a focusing state of the optical system; and
a control unit that controls a drive unit that drives a focusing lens included in the optical system, wherein
a first focusing state is the focusing state based upon the image of the subject captured by the light receiving units for each of the lenses, and a second focusing state is the focusing state based upon the image of the subject captured by the light receiving units of the plurality of lenses, and
the control unit controls the drive unit based upon the second focusing state, after controlling the drive unit based upon the first focusing state.
2. The focus detection device according to claim 1, wherein
the detection unit uses, for detecting the focusing state of the optical system, a relative position of the image of the subject with respect to the lenses as a position of the image of the subject.
3. The focus detection device according to claim 2, wherein
the detection unit uses, for detecting the focusing state of the optical system, a positional deviation of the image of the subject with respect to an optical axis of the lens as the relative position of the image of the subject with respect to the lenses.
4. The focus detection device according to claim 3, wherein:
the detection unit obtains the positional deviation of the image of the subject with respect to the optical axis of the lens based upon signals from the plurality of light receiving units provided for a first lens among the plurality of lenses and signals from the plurality of light receiving units provided for a second lens among the plurality of lenses.
5. The focus detection device according to claim 4, wherein
the detection unit obtains the positional deviation of the image of the subject with respect to the optical axis of the lens from a difference between the signals from the light receiving units provided for the first lens and the signals from the light receiving units provided for the second lens.
6. The focus detection device according to claim 5, wherein,
the detection unit calculates the difference while varying an amount of displacement of the signals from the plurality of light receiving units provided for the second lens with respect to the signals from the plurality of light receiving units provided for the first lens, and obtains, as the difference, the positional deviation of the image of the subject with respect to the optical axis of the lens from the amount of displacement while the calculated difference being a minimum.
7. The focus detection device according to claim 1, wherein
the light receiving units are arranged at a position separated from the lens substantially by a focal length of the lens.
8. The focus detection device according to claim 1, wherein
the plurality of lenses are arranged two-dimensionally.
9. The focus detection device according to claim 1, wherein the detection unit detects the focusing state of the optical system based upon a deviation between an image by a part of the plurality of light receiving units capturing the image of the subject formed by the plurality of lenses and an image by the light receiving units that are different from the part of the plurality of lenses capturing the image of the subject.

10. An image capturing apparatus comprising the focus detection device according to claim 1.

11. A focus detection device comprising:
an image capture unit that has a plurality of lenses and a plurality of light receiving units provided for each of the plurality of lenses, and that captures an image by light from a subject that has passed through an optical system; and
a detection unit that detects a focusing state of the optical system, wherein
a first focusing state is the focusing state based upon the image of the subject captured by the light receiving units for each of the lenses, and a second focusing state is the focusing state based upon the image of the subject that is formed by the plurality of lenses and is captured by the light receiving units, and
the detection unit performs changeover between a detection for the first focusing state and a detection for the second focusing state.

12. A focus detection device comprising:
an image capture unit that has a plurality of lenses and a plurality of light receiving units provided for each of the plurality of lenses, and that captures an image by light from a subject that has passed through an optical system; and
a detection unit that detects a focusing state of the optical system, wherein
a first focusing state is the focusing state based upon the image of the subject captured by the light receiving units for each of the lenses, and a second focusing state is the focusing state based upon the image of the subject that is formed by the plurality of lenses and is captured by the light receiving units, and
the detection unit performs changeover to a detection for the second focusing state from a detection for the first focusing state.

13. The focus detection device according to claim 12, wherein
the detection unit calculates an amount of focus deviation of the optical system as the second focusing state, and performs changeover to the detection for the second focusing state in case that a reliability of the amount of focus deviation is smaller than a predetermined threshold value.

14. The focus detection device according to claim 12, wherein
the detection unit calculates an amount of focus deviation of the optical system as the second focusing state, and performs changeover to the detection for the second focusing state in case that a reliability of the amount of focus deviation is larger than a predetermined value.

15. The focus detection device according to claim 12, wherein
the detection unit performs changeover to the detection for the focusing state of the optical system by the second focusing state, in case that the amount of focus deviation of the optical system is able to be calculated as the second focusing state.

16. A focus detection device comprising:
an image capture unit that has a plurality of lenses and a plurality of light receiving units provided for each of the plurality of lenses, and that captures an image by light from a subject that has passed through an optical system; and
a detection unit that detects a focusing state of the optical system, wherein
a first focusing state is the focusing state based upon the image of the subject captured by the light receiving units for each of the lenses, and a second focusing state is the focusing state based upon the image of the subject that is formed by the plurality of lenses and is captured by the light receiving units, and
the detection unit performs changeover to a detection for the first focusing state from the second focusing state.

17. The focus detection device according to claim 16, wherein
the detection unit calculates an amount of focus deviation of the optical system as the second focusing state, and performs changeover to the detection for the first focusing state in case that the amount of focus deviation is larger than a predetermined threshold value.

18. The focus detection device according to claim 16, wherein
the detection unit calculates an amount of focus deviation of the optical system as the second focusing state, and performs changeover to the detection for the first focusing state in case that a reliability of the amount of focus deviation is smaller than a predetermined value.

19. The focus detection device according to claim 16, wherein
the detection unit performs changeover to the first focusing state, in case that the amount of focus deviation of the optical system is not able to be calculated as the second focusing state.

* * * * *